United States Patent [19]

Chubb

[11] Patent Number: 4,650,637
[45] Date of Patent: Mar. 17, 1987

[54] METHOD AND APPARATUS FOR LOCATING A LEAKING FUEL ROD IN AN ASSEMBLY CONTAINING MANY RODS

[75] Inventor: Walston Chubb, Franklin, Pa.

[73] Assignee: Westinghouse Electric Corp., Pittsburgh, Pa.

[21] Appl. No.: 579,929

[22] Filed: Feb. 14, 1984

[51] Int. Cl.⁴ .............................................. G21C 17/00
[52] U.S. Cl. ..................................... 376/253; 376/250
[58] Field of Search ...................... 376/245, 250–253, 376/450

[56] References Cited

U.S. PATENT DOCUMENTS

| 3,666,625 | 5/1972 | Nybo | 376/450 |
|---|---|---|---|
| 3,878,040 | 4/1975 | Martucci | 376/253 |
| 3,899,393 | 8/1975 | Dorner et al. | 376/245 |
| 4,016,749 | 4/1977 | Wachter | 376/252 |
| 4,036,686 | 7/1977 | Weilbacher et al. | 376/251 |
| 4,039,376 | 8/1977 | Wachter | 376/252 |
| 4,192,373 | 3/1980 | Wolowodiuk | 376/250 |
| 4,193,843 | 3/1980 | Womack et al. | 376/252 |
| 4,217,173 | 8/1980 | Jabsen | 376/251 |
| 4,336,103 | 6/1982 | Katscher et al. | 376/251 |
| 4,353,863 | 10/1982 | Leenders | 376/251 |
| 4,510,117 | 4/1985 | Philips et al. | 376/254 |

FOREIGN PATENT DOCUMENTS

| 1141035 | 12/1962 | Fed. Rep. of Germany | 376/253 |
|---|---|---|---|
| 2509898 | 1/1983 | France | 376/253 |

OTHER PUBLICATIONS

Nuclear Power, Apr. 1961, pp. 81–83, Joss et al. "Burst Cartridge Detection System".

*Primary Examiner*—Salvatore Cangialosi

[57] ABSTRACT

A method and apparatus for identifying those fuel rods (32) of a multiple-rod nuclear fuel assembly (30) which contain leaks, are described. The longitudinal position of the leak in the fuel assembly is determined by moving a first test probe (62) longitudinally along the length of the fuel assembly while drawing coolant surrounding the fuel rods into the probe and sampling the radioactive product content of such coolant. The exact position of the leaking fuel rod is then determined by using second (63) and third (64) test probes to logically subdivide the fuel rods of the fuel assembly at such longitudinal position into successively smaller groups while sampling the radioactive content of coolant surrounding the smaller rod groups, until the leaking fuel rod is isolated. A test probe configuration (60) for subdividing and isolating selective groups of the fuel rods for the coolant sampling is disclosed. The test probe assembly includes a plurality of test probes (62, 63, 64) each having a pair of opposed baffle members (62.1, 62.2) secured at one end to a collector (62.3) to define a volumetric test zone (T). The baffles are configured for slidable insertion between adjacent rows of the fuel rods. Means (68, 69) for drawing liquid coolant into the collector, and probe positioning means (66, 67) are also disclosed.

34 Claims, 18 Drawing Figures

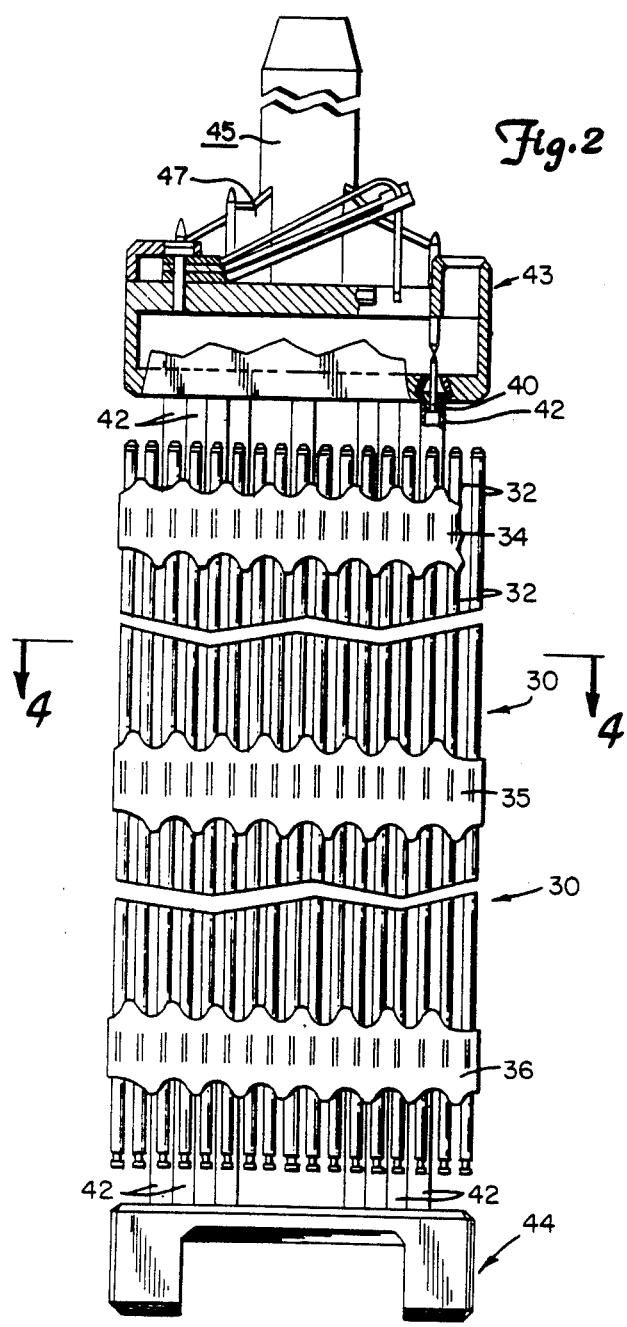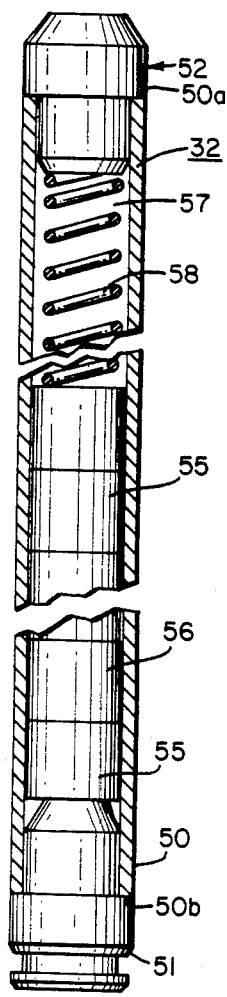

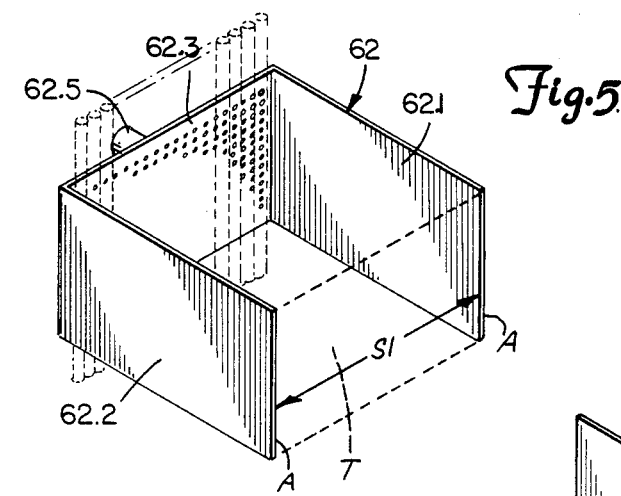
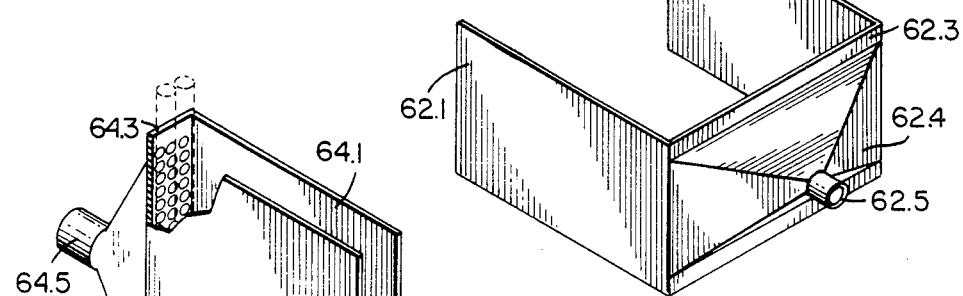
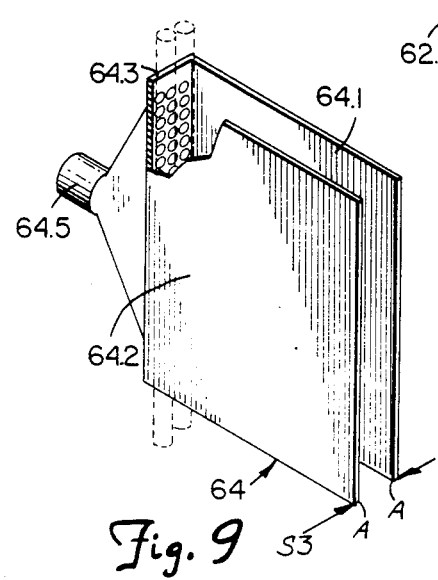
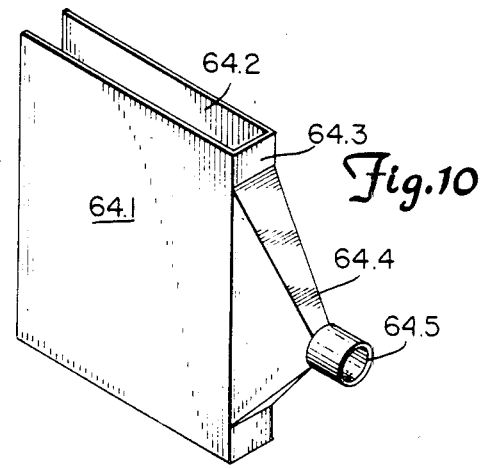

METHOD AND APPARATUS FOR LOCATING A LEAKING FUEL ROD IN AN ASSEMBLY CONTAINING MANY RODS

TECHNICAL FIELD

This invention relates generally to nuclear reactors, and more particularly to a method and apparatus for identifying those fuel rods of multiple-rod nuclear reactor fuel assemblies which contain leaks. The method and apparatus of this invention can be used on existing nuclear fuel assemblies without requiring any modification of the fuel rods or to the composite fuel assembly formed by such fuel rods.

BACKGROUND OF THE INVENTION

Nuclear reactor cores used for power generation typically have a large number of fuel assemblies arranged in suitable configuration to heat water, thereby producing steam for turning electrical generators. Each of such fuel assemblies typically contains from 49 to as many as 300 fuel rods which contain nuclear fuel. A larger nuclear reactor may contain as many as 40,000 to 50,000 fuel rods.

Each fuel rod is operatively independent of other fuel rods within a fuel assembly and is basically a metal tube approximately 0.5 inches in diameter that extends typically from 8 to 15 feet in length. Suitable fissionable material such as uranium oxide in the form of cylindrical fuel pellets is stacked within the fuel rod. The upper end of the tube is void of fuel pellets and forms a plenum, when sealed, for gas. A small clearance space is provided around the fuel pellets to accommodate expansion or swelling of the fuel. Since the nuclear fuel within the fuel rods becomes extremely radioactive during operation and is contained only by the metal tubes or sheaths of the rods, inspection methods and apparatus for verifying the seal integrity of the rods is of primary importance. During prolonged operation, the fuel rods may develop leaks as a result of cracks, pinholes or other defects, resulting in coolant seeping into the fuel rod and/or the escape of radioactive products from the fuel rod. A leakage of fission product gases and other radioactive materials from a fuel rod during reactor operation can enter the reactor coolant system. While the coolant purification system of a reactor facility is capable of handling a certain amount of radioactive fission products, it is desirable to keep the radiation level as low as possible.

In early fuel assembly designs, the individual fuel rods were part of a unitized assembly wherein the fuel rods were welded together by fuel assembly guides in a manner making it very difficult to replace a failed fuel rod. More recent designs have constructed fuel assemblies in a manner such that a fuel rod that fails before its fissionable material is spent can be removed or replaced by a new rod. Such fuel assembly design, generally referred to as a reconstitutable fuel assembly, facilitates removal and replacement of fuel rods and saves considerable expense heretofore incurred as a result of premature discharge of an entire fuel assembly because of the failure of a single one of its fuel rods.

A key step in the fuel assembly reconstitution process is the identification of the specific fuel rod or rods of the fuel assembly which have failed due to cracks, pinholes or other penetrations of the tube or cladding of the fuel rod. The first step in such process is to identify a fuel assembly containing one or more leaking fuel rods. This operation is typically performed during reactor refueling. During refueling operations, the reactor is shut down, and the reactor fuel assemblies of the reactor are usually subjected to a so-called "sipping test". The fuel assembly under test is placed in a water filled storage tank. The fuel rods of the assembly and the water in the storage tank heat up by residual decay. If a fuel assembly contains a defective rod, the fission products from that rod escape through the defect into the water. Through sampling of the water, it can be determined whether the fuel assembly contains any defective rods. Such sipping test is a totalizing method that only determines whether the entire fuel assembly contains any defective rods, and does not identify the position or location of the defect or the defective rod per se. While a number of methods and devices have been utilized in the past for detecting and locating single fuel rod failures, such techniques of the prior art have generally not provided the desired simplicity, reliability, speed, safety and cost effectiveness for such operation.

A desired rod failure detection method should provide identification of the defective rod, without requiring any significant design changes to the fuel, to the rod itself or to the fuel assembly. In short, it is most desirable that the rod failure detection mechanism be capable of operation on existing fuel assembly and fuel rod designs. Further, the test apparatus and method used should not damage or increase the risk of further damage to the fuel rods or to the fuel assembly. The fuel rod detection method should provide a high probability of being able to readily distinguish between failed and good rods, should require little if any dismantling of the fuel assembly in order to perform the test, and should be capable of testing an entire fuel assembly in a reasonably short time, and preferably while such assembly is still immersed within the coolant fluid.

This inventon is distinguished from that body of prior art relating to fuel rod failure detection that requires the fuel rod itself to be constructed in a particular fashion or to include detectable structures or members that move or change their physical condition or parameters as a result of a leak in the fuel rod. Such art is exemplified, for example, by U.S. Pat. Nos. 3,666,625 and 4,217,173 to Nybo and Jabsen respectively. In the Nybo structure, the fuel rod is configured to include a magnetic device which moves within the fuel rod in the event of a rod failure. The Jabsen invention requires a specially designed fuel rod end cap having a hollow construction, in combination with a cellular end fitting for the fuel assembly, to enable radiation probes to be lowered into registry with the fuel rod end caps for measuring radioactivity emanating from the fuel rod, thereby providing an indication of the structural integrity of the rod. In contrast to the above-described art, the present invention can be used with fuel rods and fuel assemblies constructed therefrom of any standard configuration, as long as the elongate fuel rods are arranged in generally parallel, spaced-apart relationship within the fuel assembly.

Others have devised apparatus and methods for locating leaking fuel rods in a fuel assembly, without requiring specially constructed fuel rods or significantly modified fuel assemblies. Such methods and apparatus, however, have not generally satisfied the above desired criteria for such a system. For example, U.S. Pat. No. 4,193,843 to Womack et al. describes a leak detector apparatus that applies ultrasonic waves to the fuel rods and measures the fuel rod resonance response thereto, which is indicative of the water that leaks into the failed fuel rod. The Womack method presumes that a leaking fuel rod will have an accumulation of water coolant at its lower end, and only performs its test of the fuel rod at the lower portion of the rod. Such test may be accurate for gross rod failures, but does not necessarily detect smaller rod failures which have not yet resulted in accumulation of significant amounts of coolant within the rod. U.S. Pat. Nos. 4,016,749 and 4,039,376 to Wachter describe apparatus and methods for detecting the emission of bubbles expelled from defective rods. The fuel assembly is placed within a liquid bath in a manner such that the fuel rods are differentially pressurized greater than the liquid bath. Sensing means are provided to detect bubbles emitted from the rods and to correlate the position of the bubble on the surface of the liquid bath, to that of the defective rod submerged within the bath. The accuracy of such system to identify the leaking rod depends upon the bubble traveling vertically through the liquid bath to the bath surface, and upon the accuracy of the correlation apparatus. Since the lateral spacing between adjacent fuel rods in a fuel assembly can be as small as 0.05 inches, the sensing accuracy of the bubble detection apparatus must be extremely accurate, and any deviations of the bubble from a straight-line path to the coolant surface can further lead to unreliability of this system.

Another method known in the art for detecting one or more fuel rod failures within a fuel assembly is disclosed by U.S. Pat. No. 3,878,040 to Martucci. The Martucci apparatus delivers a stripping gas to the bottom of the fuel assembly which percolates up through the assembly entraining any gaseous fission products contained in the coolant. The stripping gas and entrained gases are then collected by a hood overlying the fuel assembly and measured for radioactivity content. While such apparatus can detect a leaking fuel assembly, it cannot determine which of the fuel rods in the assembly is defective.

Another leak detection apparatus requiring specially configured fuel rods and fuel assembly is disclosed in U.S. Pat. No. 4,192,373 to Wolowodiuk. The Wolowodiuk structure includes physical leak-detection connections permanently provided to each of the fuel rods, which can be monitored periodically for leaking conditions. Such apparatus requires a duplex wall fuel rod construction as well as a relatively complicated communication channel of tubes and bores to complete the leak detection system, and does not readily lend itself to a reconstitutable fuel assembly construction.

While such prior art structures and techniques for detecting fuel rod leaks have individually addressed various ones of the desired criteria for structures, no single device or method has simultaneously satisfied all the previously described criteria. In general, either the leak detection structures of the prior art have been unduly complex or required costly, expensive sensing or detection equipment, or have been unreliable or inaccurate, or too time consuming in performing the test function. The present invention effectively addresses and overcomes most of the above-mentioned deficiencies of prior art fuel rod leak detector and locating structures and methods. The detector apparatus and methods of this invention allow accurate location of defective fuel rods of a fuel assembly without requiring any design modification to existing fuel rods or fuel rod assemblies, and uses actual leak measurement techniques to locate a leaking rod as opposed to making predictions or assumptions as to the manner or location of fuel rod failure. Further principles of this invention can be used to test a fuel assembly without requiring removal of the fuel assembly from the coolant bath of the reactor facility in which it is normally submersed.

SUMMARY OF THE INVENTION

The present invention provides a simple, reliable, safe, efficient and effective method and apparatus for locating leaking rods within a nuclear fuel assembly. The method and apparatus of this invention can be used with existing fuel assembly configurations and does not require any design changes to be made to the fuel, the fuel rod or to the fuel assembly under test. The method and apparatus of this invention can be used without increasing risk of further damage to either leaking or intact fuel rods of the assembly under test. This invention provides a reliable method for isolating leaking fuel rods from the good rods within an assembly without requiring dismantling of the fuel rod assembly to perform the testing function. The test probe apparatus of this invention is readily adaptable for use with existing structures used for moving fuel assemblies within a reactor facility.

According to one embodiment of the invention, the method of locating a defective fuel rod within a nuclear fuel assembly that is leaking radioactive products into its surrounding coolant comprises the steps of: determining the approximate longitudinal segment of the assembly at which radioactive products are being emitted from a fuel rod of the fuel assembly; and selectively sampling the coolant surrounding the fuel rods at such longitudinal segment, to isolate the fuel rod that is actually emitting the radioactive products into the surrounding coolant. The invention contemplates the use of one or more test probe members used in a succession of logical test steps in order to isolate the leaking fuel rod.

While the test probe apparatus of this invention can be used to determine whether a fuel assembly in fact contains "any" fuel rods that are leaking fissionable products into their surrounding coolant, its preferred application presumes that tests have previously been performed, which have determined that the fuel assembly to be tested by this invention does contain one or more leaking fuel rods. When thus testing a fuel assembly known to contain a leaking fuel rod, the first step in practicing the method of this invention is to determine that longitudinal segment of the fuel assembly from which radioactive products are being emitted from the defective fuel rod or rods without the assembly. According to one embodiment of the invention, the longitudinal location of the leak is determined by sampling the coolant surrounding the fuel rods of the fuel assembly under test for the leaking radioactive products at a plurality of longitudinally aligned segments of the fuel assembly, and by determining that tested longitudinal segment from which the coolant under test contained the highest sampled radioactive product content. In one embodiment of the invention this is accomplished by placing a test probe member defining a volumetric test zone, in proximity with the fuel assembly such that a longitudinal segment of the fuel assembly passes through the volumetric test zone of the probe member. By then drawing a sample of the coolant from the volumetric test zone and by measuring the radioactive product content of the drawn sample, a determination can be made as to whether the fuel rod leak is present within that fuel assembly longitudinal segment which is under test. By moving the test probe longitudinally of the fuel assembly so as to successively test adjacent longitudinal segments of the fuel assembly, the longitudinal position(s) of the radioactive product leak(s) from the leaking fuel rod(s) of the fuel assembly is established.

Once the longitudinal position of the fuel rod leak has been determined, the exact fuel rod or rods which are leaking are determined by selectively sampling the coolant at that longitudinal position, surrounding different ones of said fuel rods, to thereby determine the exact coordinates of the leaking fuel rod within the cross-sectional matrix of said fuel rods comprising the fuel assembly. According to one embodiment of the invention, the step of selectively sampling the coolant surrounding the fuel rods at the determined longitudinal segment of the fuel assembly at which the leak occurs comprises: dividing the fuel rod matrix into identifiable submatrices of such fuel rods; and sampling the fuel rods within the submatrices, in a logical manner, for radioactive products to logically isolate that fuel rod or rods that is leaking. According to one embodiment of the invention, the sample testing is performed so as to first isolate that quadrant of the fuel rod matrix which contains the leaking fuel rod, and to thereafter subdivide the identified quadrant into ordered groups of fuel rods and to systematically sample the coolant surrounding such ordered fuel rod groups so as to isolate the leaking fuel rod. According to one embodiment of the invention, the step of subdividing the fuel rod matrix into submatrices comprises selectively inserting one or more baffle members between adjacent rows of the fuel rods within the matrix so as to isolate the external environment of the fuel rods within one submatrix from that of an adjacent submatrix.

The invention includes not only the method of locating the position of the leaking fuel rod within the fuel assembly, but also the test probe apparatus for performing the testing function. According to one embodiment of the invention, such test probe apparatus comprises a pair of opposed baffles longitudinally extending between first and second ends and connected at their first ends by means of a collector in a manner such that the volume defined between the baffles and the collector forms the volumetric test zone. The collector is configured to collect liquid coolant drawn from the volumetric test zone. The baffle and collector probe arrangement is configured for operative alignment with a nuclear fuel rod assembly such that the baffles laterally project on opposite sides of one or more fuel rods of the assembly such that a longitudinal segment of one or more fuel rods of the assembly can be positioned selectively within the volumetric test zone of the probe apparatus. The test probe apparatus may also include means for drawing the liquid coolant from the volumetric test zone and through the collector, as well as means for measuring the radioactive content of such coolant sample drawn through the collector. The test probe apparatus may also include means operatively connected with the test probe apparatus for moving the test probe so as to longitudinally and laterally move the volumetric test zone relative to the fuel rods of the fuel assembly so as to select those fuel rods which are to be disposed within the volumetric test zone at any instant of time.

According to a preferred application of the present invention, a plurality of test probes are used to perform the logical testing operation which determines the location of the leaking fuel rod of the fuel assembly. The actual number of such test probes utilized in any particular application will depend upon the configuration of the fuel assembly being tested, upon the number of fuel rods within such fuel assembly, and upon the logical testing sequence employed to determine the exact position of the leaking fuel rod within the fuel rod assembly matrix. In the preferred embodiment, three such probe members are used; however, it will be understood that any number of such probe members could be used within the scope of this invention. In the preferred embodiment of the invention, the first probe member is sized and configured so as to encompass all of the fuel rods within its volumetric test zone, and is used to determine the longitudinal segment of the fuel assembly at which the leak actually occurs, or is noticeably detectable. The second test probe in the preferred embodiment described has a volumetric test zone approximately equal to one-half that of the first test probe, and is used in a manner so as to subdivide the fuel rod matrix into four quadrants for identifying which quadrant contains the leaking fuel rod. The third test probe member is used in the preferred embodiment to further subdivide the identified leaking quadrant into smaller test submatrices, until the exact location of the leaking fuel rod is determined. According to a preferred construction of the test probe members of this invention, the baffle members are constructed of thin, semi-rigid sheet material having a thickness sized to readily slide between adjacent rows of fuel rods within the fuel rod assembly matrix so as to isolate such adjacent fuel rods from one another when drawing coolant from the volumetric test zone defined by the test probe during a sampling operation.

It will be readily appreciated from a more detailed description of preferred embodiments of the invention, that use of the methods and apparatus of the invention enable rapid and reliable detection of those fuel rods within a fuel assembly which are leaking, so that decisions regarding the repair of the defective fuel assembly can be reliably made. It will be appreciated that while particular sequential methods and test probe apparatus will be disclosed in describing the preferred embodiments of the invention, the invention is not limited to such specific techniques or configurations. For example, while the test probes of the preferred embodiment will be described relative to particular dimensions or materials, the invention is not limited to such specific materials or dimensions. Further, while the invention will be described in an application wherein a rectangular fuel assembly is being tested, the invention is not limited to use with fuel assemblies with rectangular cross-sectional fuel assembly matrices. Further, while the test probe of the preferred embodiments has a "U-shaped" baffle and collector configuration, the invention is not limited to such configuration or to the use of test probes having baffles or collector members configured as illustrated and described with respect to the preferred embodiments. These and other variations and modifications of the invention will become apparent to those skilled in the art in light of the following description of preferred embodiments of the invention.

BRIEF DESCRIPTION OF THE DRAWING

FIG. 2 is a view in elevation, partially in section, illustrating the design of a typical fuel assembly of a nuclear reactor.

FIG. 3 is an enlarged sectional view with portions thereof broken away, of one of the fuel rods of the fuel assembly of FIG. 2.

FIG. 5 is a perspective view of a first probe member constructed according to the principles of this invention.

FIG. 6 is a perspective view of the probe member of FIG. 5, illustrated from the opposite end thereof.

FIG. 9 is a perspective view of a third probe member constructed according to the principles of this invention.

FIG. 10 is a perspective view of the probe member of FIG. 9, illustrated from the opposite end thereof.

FIG. 13b is a schematic elevational view of the probe member placement of FIG. 13a.

FIG. 14b is a schematic elevational view of the probe member placement of FIG. 14a.

FIG. 15b is a schematic elevational view of the probe member placement of FIG. 15a.

DESCRIPTION OF THE PREFERRED EMBODIMENT

Figure 1:
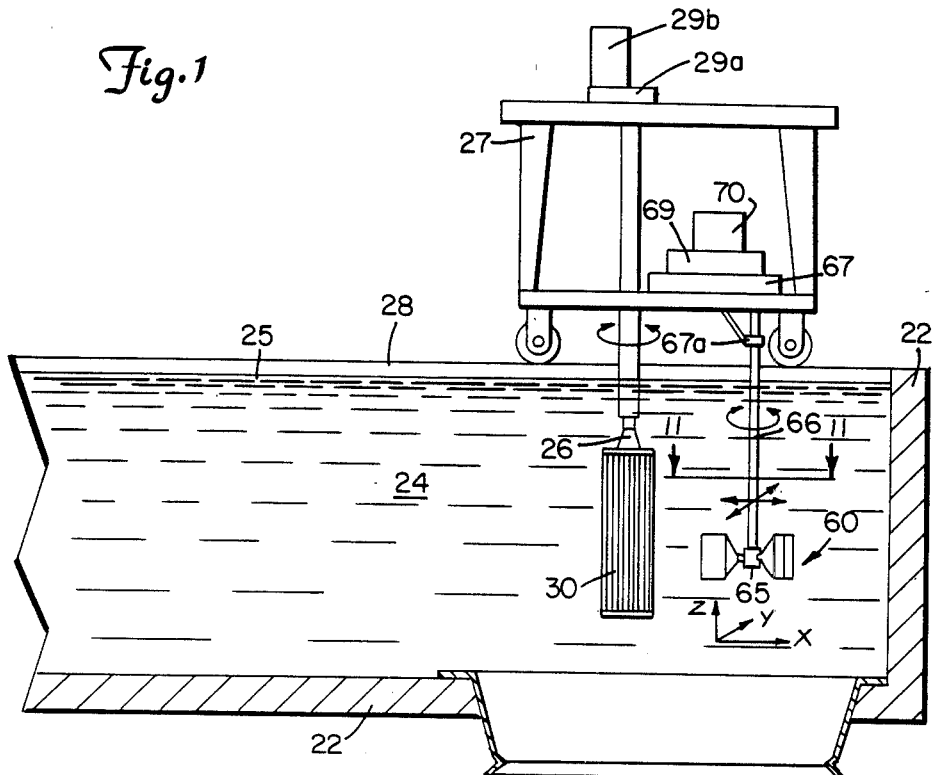
FIG. 1 is a diagrammatic sectional view through a portion of a reactor facility illustrating the functional relationship of the leak detector probe of this invention to a fuel assembly.

Referring now to the Drawing, wherein like characters represent like parts throughout the several views, there is generally illustrated in FIG. 1 a diagrammatic view of a portion of a typical nuclear reactor installation. The nuclear reactor vessel (not illustrated) is generally located in an adjacent building connected to the spent fuel storage pool, generally illustrated at 22, by a water-filled tunnel (not illustrated). The spent fuel storage pool, will be understood by those skilled in the art to be of any suitable or usual design, and will not be detailed herein. The pool basin 24 is empty during normal reactor operation, but during refueling operations, is filled with coolant up to a level such as indicated at 25 so that the fuel assemblies (hereinafter described) are kept immersed in the coolant. In the preferred embodiment, the coolant is water. It will be understood, however, that the principles of this invention apply equally well to the use of reactors using other than water for the coolant.

During the refueling operation, fuel assemblies such as the one indicated at 30 are lifted from the reactor by suitable lifting means described in more detail hereinafter. The fuel assemblies are vertically lifted from the reactor vessel, are laid down and carried horizontally through a water-filled tunnel to the spent fuel storage basin 24 where they are restored to a vertical position by lifting means essentially identical to that used for lifting the fuel assemblies from the reactor vessel. The lifting means generally includes a telescoping grapple tool 26 suspended from a hoist or crane member 27 which moves the fuel assembly 30 in a vertical direction. The hoist structure 27 is mounted on tracks, generally illustrated at 28, for laterally positioning the grapple tool in vertical alignment with the fuel assembly 30 to be handled, and for laterally moving the fuel assemblies. It will be understood that while only one such track 28 is illustrated in FIG. 1 for moving the hoist apparatus 27 in a lateral direction, lying in the plane of the illustration, that other appropriate track means (not illustrated) are also provided for moving the hoist structure in the lateral direction perpendicular to the plane of the FIG. 1 illustration.

A more detailed illustration of a typical fuel assembly 30 is illustrated in FIG. 2. Referring thereto, the fuel assembly 30 includes a plurality of fuel rods 32, assembled in parallel and held in spaced relationship to each other by a plurality of support grids 34, 35 and 36 spaced along the fuel assembly length. Only three of such support grids are illustrated in FIG. 2; however, it will be understood that more of such support grids may be required to adequately support the fuel rods 32 along their length. The fuel rods 32 are closely spaced by the support grids 34, 35 and 36 along their entire lengths, being separated by approximately only 0.12 to 0.20 inches. In a typical fuel assembly 30, the fuel rods 32 have an outside diameter of approximately 0.36 to 0.50 inches and a typical length ranging from 8 to 15 feet. Each fuel rod 32 contains suitable fissionable material, as will be described in more detail hereinafter. The illustration of FIG. 2 depicts only the forwardmost row of fuel rods 32, however, it will be understood that in a complete fuel assembly 30, there will typically be from 49 to as many as 300 fuel rods contained within the assembly, and typically arranged in matrix fashion when viewed in cross-section as in FIG. 4.

Figure 4:
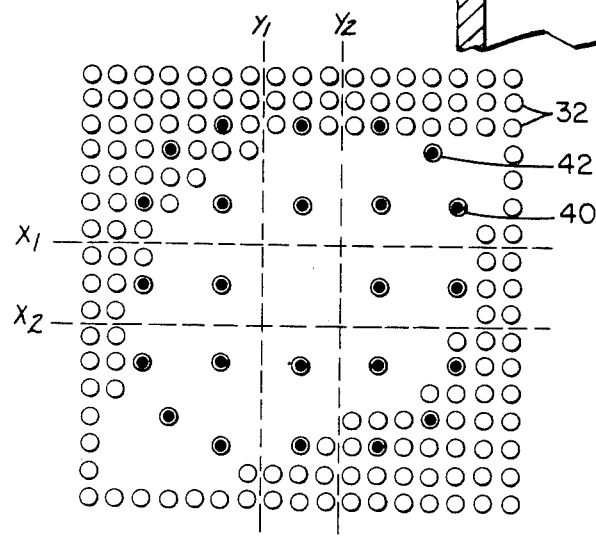
FIG. 4 is a diagrammatic sectional view of the fuel assembly of FIG. 2, generally taken along the line 4—4 of FIG. 2.
Figure 7:
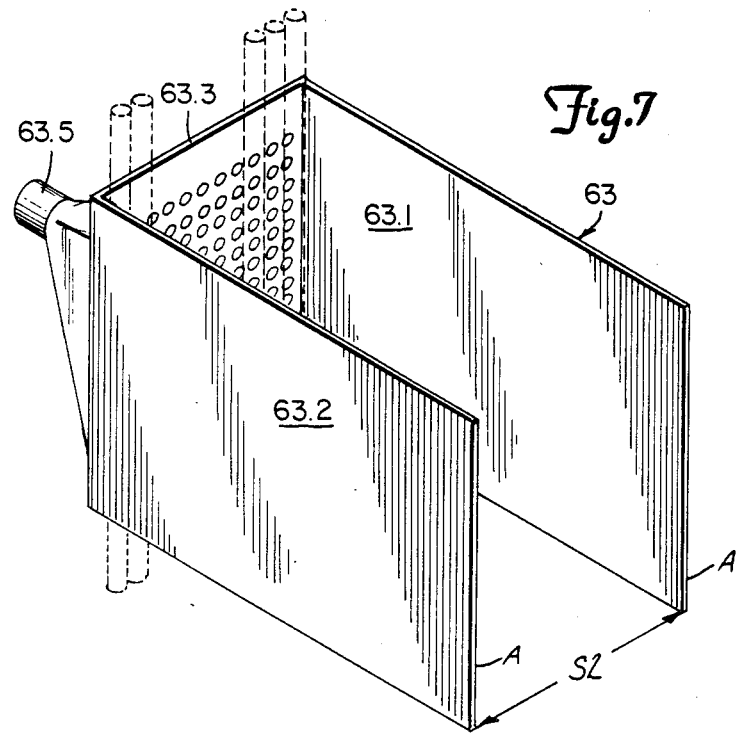
FIG. 7 is a perspective view of a second probe member constructed according to the principles of this invention.
Figure 8:
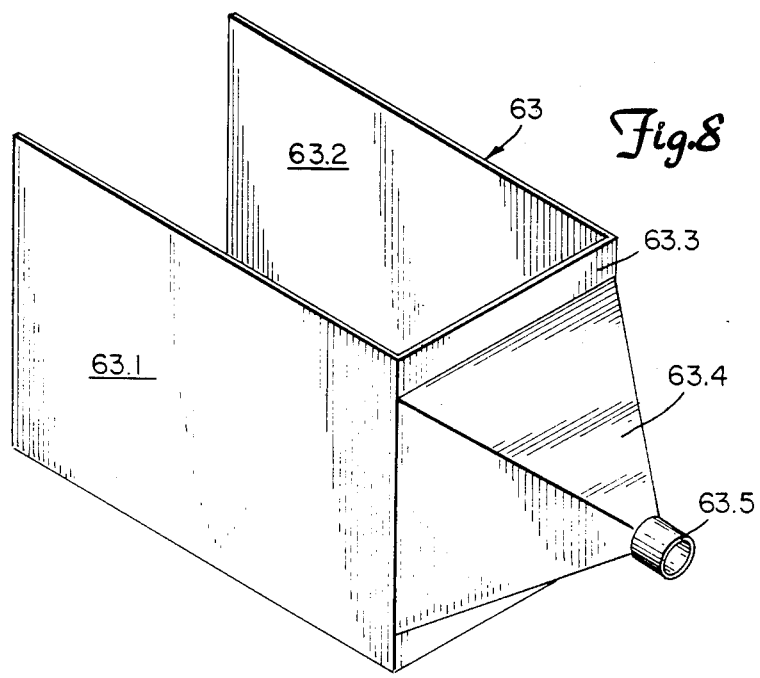
FIG. 8 is a perspective view of the probe member of FIG. 7, illustrated from the opposite end thereof.

A plurality of control rods, generally designated at 40, are reciprocally movable in control rod guide tubes 42 at predetermined positions in each selected fuel assembly within the reactor. The control rods are used to control the fission process. The control rod guide tubes are attached to the support grids 34, 35 and 36 and are interspersed (in cross-sectional view as illustrated in FIG. 4) among the fuel rods 32. With reference to FIG. 4, the control rods are diagrammatically illustrated as solid circles as compared to the open ring configuration of the standard fuel rods such as hereinafter described with reference to FIG. 3. It will be understood that the control rod depiction of FIG. 4 is for diagrammatic illustrative purposes only, and does not represent the physical nature of the control rod structure. The fuel assembly also includes a top nozzle 43 and a bottom nozzle 44 to which opposite ends of the control rod guide tubes 42 are attached, thereby forming a unitized fuel assembly which can be conveniently handled without risk of damage to the assembly contents. The guide tubes 42 typically include sleeve members for welding to the upper and lower support grids 34 and 36 and to the top and bottom nozzles 43 and 44. Since the control rod structure does not form a part of this invention, other than for the physical spacing of the control rods with relation to the fuel rods as depicted in FIG. 4, further discussion thereof will not be detailed herein, it being understood by those skilled in the art that the fuel assembly 30 is constructed in a typical manner well known by those skilled in the art suitable for appropriate use in a nuclear reactor.

Similarly, the top and bottom nozzle structures 43 and 44 respectively, will not be described in detail herein, as they do not form a part of the invention.

An enlarged view of one of the fuel rods 32, as typically constructed, is illustrated in FIG. 3. Referring thereto, each fuel rod is cylindrically shaped and has an outer jacket or casing 50 extending between upper and lower ends 50a and 50b respectively and defining an internal cavity. The lower end 50b of the casing 50 is sealed by a lower end plug or cap 51. A plurality of cylindrical fuel pellets 55 are stacked within the internal cavity defined by the casing 50, and have an outside diameter slightly less than the inside diameter of the casing 50 so as to define a fuel-clad gap 56 therebetween. The uppermost fuel pellet 55 is spaced back from an upper end plug or cap 52 which seals the upper open end 50a of the cladding 50, so as to define a space or plenum 57 therebetween. A spring 58 is compressed between the lower surface of the upper end plug 52 and the upper surface of the top fuel pellet to retain the ordered position of the fuel pellets within the casing cavity.

Typically, the casing 50 and the upper and lower end plugs 51 and 52 are constructed of a zirconium alloy material. The upper and lower plugs 51 and 52 are typically welded to the upper and lower ends 50a and 50b respectively of the casing 50. The compression spring 58 also is typically of a material such as 304 stainless steel. The fuel pellets 55 are of appropriate fissionable material, and typically comprise uranium oxide. The fuel-clad gap 56 provides for radial swelling or expansion of the pellets 55 during operation. The plenum 57 is often pre-pressurized with an inert gas such as helium such that during operation of the fuel rod, the differential pressure between the fluids within the internal cavity of the fuel rod and the outer coolant bath is minimal. The above-described fuel rod structure contains no special apparatus for detecting a breach of the cladding jacket 50 that would permit the surrounding coolant (typically water) to leak into the internal cavity of the fuel rod, and conversely for the radioactive material contained within the fuel rod from leaking out into the coolant. While the present invention provides simple apparatus and method for locating a cladding breach of such a fuel rod, it will be understood that the invention would apply equally well to the detection of cladding failures of fuel rods having internal structural configurations, cladding and coolant materials other than that above-described, as long as the general matrix fuel assembly structure such as that generally illustrated in FIG. 4 is preserved.

Figure 11:
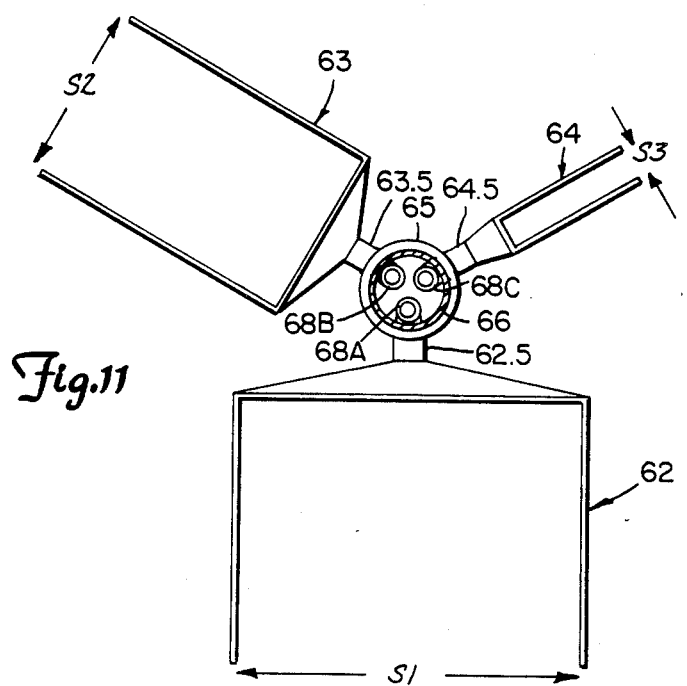
FIG. 11 is a view of the probe head members illustrated in FIG. 1, generally taken along the line 11—11 of FIG. 1.

The present invention includes both test probe apparatus and a method for utilizing the probe apparatus in a manner so as to systematically test the fuel assembly with the probe apparatus so as to eliminate sound fuel rods and to successively narrow down the number of fuel rods being tested, until the defective fuel rod or rods are located. The test probe apparatus is generally indicated at 60 in FIG. 1. As illustrated in FIGS. 1 and 11, the probe apparatus 60 includes three probe heads 62, 63 and 64 attached to a support mast 66 by means of a common coupling 65. It will be understood that while three probe heads are illustrated for use in testing a 17 by 17 fuel rod matrix, that other sized fuel assemblies might require more or fewer probe heads. The tri-probe head arrangement is illustrated in more detail in FIG. 11. While a particular tri-probe head configuration will be described in the preferred embodiment, it will be understood from a more detailed description of the invention, that other appropriate probe head and mounting configurations could be employed, and that it is not necessary for the multiple probes to be commonly attached to a single support mast or coupling as illustrated. The arrangement illustrated, however, provides a simple technique for indexing and positioning the multiple probe heads throughout the testing procedure, with minimum interference from those probe heads not in current use in any particular portion of the test procedure.

The support mast 66 is operatively mounted to a Probe Position Control Module, generally functionally illustrated at 67. While a separate such Control Module 67 has been illustrated in FIG. 1, it will be understood that various functions of such Control Module could be performed by other means. The Control Module includes appropriate apparatus, well-known and/or capable of implementation by those skilled in the art, for moving the support mast 66 and attached probe assembly so as to move the probes in the desired three orthogonal directions of movement (i.e. in the "x", "y" and "z" orthogonal axis directions) so as to align and move the probe head assembly 60 relative to the fuel rod assembly 30. The Probe Position Control Module 67 also includes a control feature (generally illustrated at 67a in FIG. 1) which controls rotational indexing of the support mast 66 and the attached probe assembly 60 about the vertical or "z" axis, to position the desired probe head (62, 63 or 64) in operative alignment with the fuel rods 32 of the fuel assembly 30, as hereinafter described in more detail. It will be understood, that while a separate Probe Position Control Module 67 has been illustrated for performing the movement operations on the probe assembly 60, that the described manner of performing such probe position control is not unique, and that other movement control techniques could be devised by those skilled in the art. For example, certain of the motion control functions could be and generally are associated directly with the movement control functions of the hoist apparatus 27 or with the telescoping grapple tool 26.

The probe members 62, 63 and 64, are illustrated in more detail in FIGS. 5 through 10. Probe members 62, 63 and 64 are similar to each other in construction and function, but differ in their relative sizes and material dimensions, and are used at different times in the testing sequence for locating the leaking fuel rod or rods of a fuel assembly. A preferred construction of the probe assembly can be described with reference to probe member 62, illustrated in FIGS. 5 and 6, it being understood that except for dimensions and material parameters, probes 63 and 64 contain identical functional elements as probe 62. Referring to FIGS. 5 and 6, probe 62 contains a pair of opposed containment or baffle members 62.1 and 62.2 of semi-rigid sheet-like material, connected at one end by a diffuser plate, generally illustrated at 62.3. The diffuser plate 62.3 mounts the baffle members 62.1 and 62.2 in generally parallel spaced-apart relationship, separated by a lateral spacing distance of "S1". The respective materials of the containment plates 62.1 and 62.2 and the diffuser member 62.3 are selected such that their interconnection will provide a semi-rigid structure wherein the containment plates 62.1 and 62.2 extend in cantilevered manner from their fixed end to their distal ends thereof, denoted at "A" in the figures, so as to substantially maintain the interplate spacing (S1) therebetween at their distal ends "A". In the preferred embodiment illustrated, the containment plates 62.1 and 62.2 are constructed of stainless steel sheet material; however, it will be understood that any appropriate material having the desired rigidity and resistance to radioactive contamination properties could be used. Further, while the containment plates 62.1 and 62.2 are illustrated as being generally rectangular in the preferred embodiment, it will be understood that other appropriate shapes could be employed within the spirit and scope of this invention.

The diffuser plate member 62.3 is perforated so as to allow fairly free flow of fluid therethrough, while providing the structural support required for maintaining the containment baffles 62.1 and 62.2 in generally parallel spaced-apart relationship. The diffuser plate member 62.3 forms one wall of a collector member, generally illustrated at 62.4. The collector member 62.4 comprises one or more surfaces integrally connected with the diffuser plate 62.3 and/or the baffle members 62.1 and 62.2 so as to define a collection chamber for fluid flowing through the perforations in the diffuser plate 62.3. The walls or surfaces of the collector member 62.4 terminate at an output port 62.5, defining an orifice opening into the inner chamber or cavity defined by the collector walls 62.4 and providing a continuous path therewith through the perforations of the diffuser plate 62.3. The outlet port 62.5 is suitable for connection to a "sample line", as hereinafter described.

The construction of probe members 63 and 64 is functionally identical to that of probe 62, wherein like members of probes 63 and 64 are identified by similar decimal reference numerals following the primary probe identifier number 63 or 64. For ease of later identification, however, the lateral spacing between the baffle members 63.1 and 63.2 of probe 63 is designated as "S2", and the lateral spacing between baffle members 64.1 and 64.2 of probe 64 is denoted by the label "S3". In further reference to FIGS. 5 through 10, and particularly with regard to FIGS. 5, 6, 9 and 10, it should be noted that the probe members 62 and 64 are not illustrated as drawn to the same scale. As illustrated in FIGS. 5 and 6, the probe 62 is drawn to approximately one-half of the scale of probe 64 illustrated in FIGS. 9 and 10. Accordingly, dimensional comparisons between the probes 62 and 64 as illustrated in FIGS. 5, 6, 9, and 10 respectively should not be inferred from such figures, but should only be made with respect to the later-described FIGS. 13 through 15.

Referring to FIGS. 1 and 11, the output ports 62.5, 63.5 and 64.5 of probes 62, 63 and 64 respectively are mounted to the coupling 65 and are respectively continuously connected with sample lines 68A, 68B and 68C respectively. The sample lines 68 are mounted within the support mast 66 and operatively extend therethrough up to a pump assembly, generally referred to at 69, illustrated as mounted on the hoist apparatus 27 although the pump 69 and its associate sensor apparatus 70 generally would be located at a more convenient location on the walkways around the spent fuel storage pool 22. Appropriate valve or sample line selector means (not illustrated) associated with the pump 69 or configured into the support mast 66 or coupling 65 assembly selects that one of the sample lines 68A through 68C which is operatively connected to the pump 69 at any instant of time. A sensor apparatus, generally designated at 70, is also mounted on the hoist apparatus 27 and is cooperatively connected with the sample line 68 to continuously monitor and sense the liquid flowing therethrough for radioactive fission products such as iodine-131, xenon-133, cesium-134, cesium-137, or the like, as hereinafter described in more detail.

Figure 12:
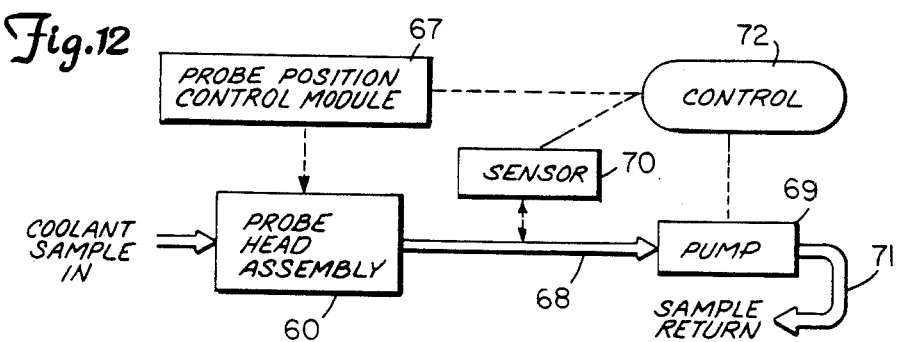
FIG. 12 is a schematic illustration of the functional relationship of the various operative elements of the invention.

A functional block diagram representation of the operative elements related to the probe assembly is illustrated in FIG. 12. Referring thereto, the probe head assembly 60 is illustrated as a functional block, the physical manipulation of which is controlled by the probe position control module 67. The probe head assembly 60 is operatively connected to the pump 69 by means of the sample line 68. When the pump 69 is energized, a coolant sample is drawn through the probe head assembly 60. The coolant sample passes through the appropriate sample line 68(A-C), through the pump 69 and is returned back to the coolant bath by an appropriate return line illustrated at 71 in FIG. 12. The sensor 70 is operatively connected to continuously monitor the coolant sample flowing through the sample line 68, and may be any appropriate multichannel analyzer for radioactive fission products. While not illustrated in the other figures, it will be understood that appropriate control means 72 are provided to correlate the operation of the probe position control module 67, the pump 69, the sensor 70, and to handle and manipulate the data and information received as a result of the tests.

Each of the probes 62, 63 and 64 defines a volumetric test zone defined by that volume contained between the confinement baffle plates and the diffuser plate and the open ends "A" of the baffle plates. In the preferred configuration of the probe members illustrated in the Drawing, such volumetric test zone is rectangular in shape, and is schematically illustrated at "T" in FIG. 5. The volumetric test zone "T" of a test probe is that region or zone through which the probe will draw its coolant sample when operatively connected with the pump 69. When the probe is positioned around one or more fuel rods such that the fuel rods are aligned generally parallel with the probe's opposed baffle plates, the probe, when operatively connected with the pump 69, will draw coolant from around those segments of the fuel rods which lie within the probe's volumetric test zone "T". The coolant will pass through the probe's diffuser member, through its collector and the output port thereof, into the sample line 68 for analysis by the sensor 70. If that segment of a fuel rod contained within the volumetric test zone "T" of the probe contains a leak such that fissionable material is being expelled through the leak and into the coolant surrounding the fuel rod, such fissionable material will be drawn through the diffuser plate collector of the test probe and be detected by the sensor 70. Accordingly, by selectively positioning the probe members into the fuel assembly, between the fuel rods in the manner herein described, the location of leaking fuel rods can be readily and accurately determined.

The dimensions of the respective probe members depend upon the desired size of the volumetric test zone "T" for each probe, which in turn depends upon the dimensions of the particular fuel assembly with which the test probes will be used. To simplify further description of the invention, the probes 62, 63 and 64 will hereinafter be described with respect to their applicability to testing a typical fuel assembly 30 having a cross-sectional fuel rod matrix of 17 by 17 (i.e. 289) fuel rods, generally as illustrated in FIG. 4. It will be understood, however, that the principles of the invention apply equally well to the testing of fuel assemblies containing any number of fuel rods, whether or not such assemblies have a square, or even a rectangular cross-sectional configuration. Referring to FIG. 4, in a typical 17 by 17 fuel rod assembly, the control rod guide tubes will be positioned throughout the matrix in an ordered manner, as dictated by the configuration of the rod cluster control assembly 45 and its interconnecting control rod arm structure 47 (see FIG. 2). For the typical 17 by 17 matrix configuration with which this invention will be described, the control rods 40 and associated guide tubes 42 will be positioned throughout the matrix as illustrated in FIG. 4. Referring thereto, it will be noted that certain adjacent rows of the fuel rod matrix will not contain any control rods or associated guide tubes. For simplicity in this description, the control rods and associated guide tubes will collectively be referred to as merely "control rods". In the FIG. 4 arrangement, the example, there are no control rods in either the seventh or eighth rows of fuel rods, as counted inward from any of the corners. Those divisions between the respective seventh and eighth rows have been denoted by "X1", "X2", "Y1" and "Y2". The significance of this fact is that since the diameter of the control rod guide tubes is slightly larger than that of a standard fuel rod, the inter-rod spacing between adjacent rows is narrower in those rows containing control rods, than in those without control rods. Accordingly, the inter-rod spacing in those positions marked "X1", "X2", "Y1" and "Y2" in FIG. 4 will be slightly wider than the spacing between a fuel rod row and any other adjacent row which contains a control rod. Therefore, in designing the probe members, and in particular the baffle or containment wall member portions thereof which are to slide between adjacent rows of the fuel rods and control rods, it is desirable to know not only the inter-rod spacing, but also those adjacent rows of the matrix which do not contain any control rods. This consideration will be appreciated more following further description of the invention, and in particular following a description of the method in which the probe members 62, 63 and 64 are to be used.

Figure 13A:
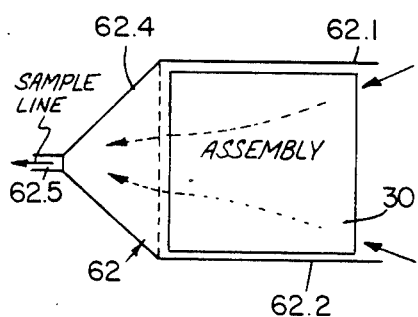
FIG. 13a is a schematic top view illustrating operative placement of the probe member of FIGS. 5 and 6 according to the method of this invention.

Probe member 62 is the largest of the three probe members, and is configured to have a volumetric test zone with parameter "S1" suitable for completely encompassing an entire side (all 17 fuel rods) of a fuel assembly within its volumetric test zone "T". This situation is diagrammatically illustrated in FIG. 13a, wherein the fuel assembly 30 is illustrated in top plan. The length of the volumetric test zone "T" (as measured from the diffuser plate member 62.3 to the distal end "A" thereof) of the opposed baffle members 62.1 and 62.2 is sufficiently long so as to extend slightly beyond the outermost row of fuel rods of the fuel assembly when the probe 62 is positioned so as to enclose the cross-sectional area of the fuel assembly as illustrated in FIG. 13a. The "height" dimension of the baffle plates 62.1 and 62.2 and of the collector diffuser member 62.3 may vary, and is preferably of approximately the same or greater dimension as the "length" of the baffle plates 62.1 and 62.2. The height dimension should be adequate to insure that the coolant sample being drawn into the collector 62.4 is primarily being drawn from the central area of the volumetric test zone "T" and is not primarily coming from the open upper and lower ends of the test probe. Since the baffle members 62.1 and 62.2 of the probe 62 extend outside of the outer rows of fuel rods of the fuel assembly 30, and are not configured to be placed between adjacent rows of fuel rods of the assembly, there are no particular limitations placed upon the maximum wall thickness of the baffle members 62.1 or 62.2.

The apparatus of this invention is primarily intended for isolating the leaking fuel rod or rods of a fuel assembly 30 that has already been determined to contain a leaking rod. However, the principles of this invention, and particularly the use of probe 62 could be used in the first instance to determine whether a fuel assembly 30 contains any leaking fuel rods.

Figure 13B:
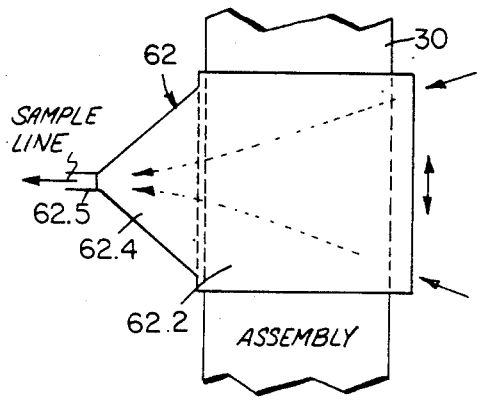

The purpose of using probe member 62 is to determine the longitudinal (i.e. "vertical" or in the "z" direction) position of a leak or defect in one or more fuel rods of the fuel assembly that are ejecting fissionable products into the coolant. Probe member 62 is used as illustrated in FIG. 13 by moving the probe member 62 into cooperative alignment with the fuel assembly 30 such that the entire cross-sectional area of a vertical segment of the fuel assembly is contained within the volumetric test zone "T" of the probe 62. Preferably, the probe is initially lowered in the "z" direction to begin testing at the lower end of the fuel assembly 30 as it is suspended in the coolant channel by the hoist 27, as illustrated in FIG. 1. When so positioned, the pump 69 is energized so as to draw coolant through those longitudinal segments of the fuel rods enclosed within the volumetric test zone "T" of probe 62 and into the collector 62.4. The coolant sample is transmitted through the sample line 68 to the sensor 70 for detection of fissionable products therein. The vertical ("z" direction) position of the probe member 62 is longitudinally moved along the length of the fuel assembly 30 until the sensor detects a comparative increase in the amount of radiation in the coolant, which indicates the presence of a leaking fuel rod. The probe motion is fixed at that vertical (i.e. longitudinal) location with respect to the fuel assembly 30 and the process is ready for use of the next probe 63. Alternatively, in case the fuel assembly may contain more than one defective fuel rod, the entire longitudinal length of the fuel assembly may be tested by probe 62, and those longitudinal positions at which leaks are detected are each recorded, for subsequent testing at each of such positions by probes 63 and 64.

The second probe member 63 is sized to localize the particular "quadrant" in which the leaking rod whose vertical or longitudinal position was determined by probe 62, is positioned. Accordingly, the "S2" dimension of probe member 63 is sized to approximately one-half of the width dimension of the fuel rod matrix (approximately one-half of the "S1" dimension). The thickness of the baffle members 63.1 and 63.2 is sized so as to permit free sliding movement of the baffle members between adjacent rows of the fuel rods of the fuel assembly. As previously discussed with reference to FIG. 4, if the fuel assembly with which the probe members are to be used has particular adjacent rows close to the center of the matrix which do not contain control rods, then it is desirable to slide the baffle wall members 63.1 or 63.2 through those inter-row positions, since the baffle members 63.1 and 63.2 can be constructed of somewhat thicker material than would be possible if they were required to traverse inter-rod spacings between rows which contain control rods. As an example, in a preferred construction of probe member 63, which is designed to be slid into the 17 by 17 matrix of FIG. 4 along the "X1", "X2", "Y1" and "Y2" paths, the baffle walls 63.1 and 63.2 can be formed from sheet material as thick as 0.10 inches, providing increased rigidity to the probe structure than would be the case if the baffle members were required to be thinner so as to traverse narrower inter-rod spaces. Accordingly, in a preferred construction of the probe member 63, as applied to the 17 by 17 matrix configuration illustrated in FIG. 4, the inter-baffle spacing dimension "S2" is sized to accommodate ten fuel rods within the volumetric test zone "T". The length of the baffle plates 63.1 and 63.2 is generally the same as that of the baffle plates 62.1, 62.2 of the probe member 62, such that when inserted between fuel rods of the fuel assembly as illustrated in FIG. 14, the distal end "A" of the baffle plates 63.1 and 63.2 extends slightly beyond the outermost row of fuel rods.

Figure 14A:
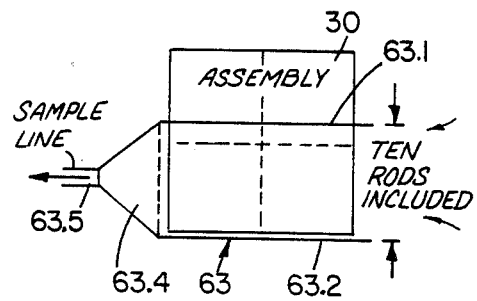
FIG. 14a is a schematic top view illustrating operative placement of the probe member of FIGS. 7 and 8 according to the method of this invention.
Figure 14B:
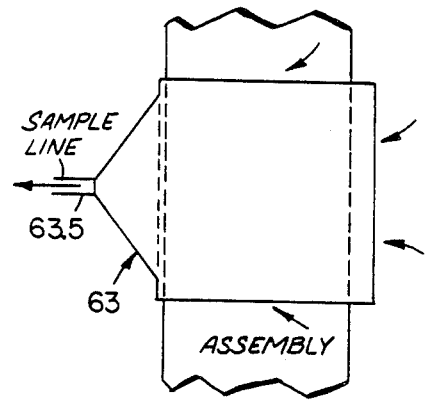

Referring to FIG. 14a, a probe 63 is used to locate that quadrant of the fuel assembly in which the leaking rod is positioned. The quadrant is determined by inserting probe 63 four or less times into the fuel assembly matrix 30 in a manner so as to isolate that quadrant (Q1-Q4) containing the leaking rod. All insertions of the probe member 63 are performed at that vertical position determined by probe 62 to be the vertical (longitudinal) location of a leak. In practice, such vertical leak position determined by probe 62 may actually be slightly above that segment of the defective fuel rod at which the actual leak is positioned. This situation can result from the leaking fission products "rising" through the coolant after leaving the defective fuel rod. Testing of the coolant sample drawn through probe 63 at that position of probe 63 as illustrated in FIG. 14a will determine whether a leaking rod exists in quadrants "Q3" or "Q4". By moving the probe 63 in the "x" direction so as to disengage baffle member 63.1 from the fuel assembly 30, probe 63 can next be shifted in the "y" direction so as to insert baffle member 63.2 into the fuel assembly such that quadrants "Q1" and "Q2" of the assembly are encompassed within the volumetric test zone "T" of probe 63. By sampling the coolant drawn from quadrants "Q1" and "Q2", it can be determined whether the leaking fuel rod is present in those quadrants. Similarly, probe 63 can then be removed from the fuel assembly 30, and the fuel assembly 30 rotated by means of the rotation control 29b so that probe 63 can be reinserted into the fuel assembly to successively test in similar manner quadrants (Q2, Q4) and (Q1, Q3) respectively. By simple, logical deduction as to those of the four tests in which leaks were detected, the particular quadrant in which the leaking rod is present is determined. An example of a typical test procedure is illustrated in the following table. In the table, an "X" designates those quadrants under test in which leaks are detected, and an "O" indicates those tested quadrants where no leak is detected. A dash indicates that no leak test was performed on that particular quadrant during a respective probe insertion step. In Test 1, (wherein quadrants Q1 and Q2 were included within the volumetric test zone of probe 63) a leak was detected in quandrants "Q1" and "Q2". Tests 2 and 4 indicated no detected leaks. Test 3 detected a leak in quadrants Q1 and Q3. Since the only quadrant common to Tests 1 and 3 was Q1, Q1 is deduced to be that quadrant containing the leaking tube.

| Quadrant | Q1 | Q2 | Q3 | Q4 |
| --- | --- | --- | --- | --- |
| Test Insertion | | | | |
| Test 1 | X | X | — | — |
| Test 2 | — | — | O | O |
| Test 3 | X | — | X | — |
| Test 4 | — | O | — | O |
| Result: | Leak | No Leak | No Leak | No Leak |

Key:
"—" indicates quadrant not involved in test;
"X" indicates leak present in quadrants tested;
"O" indicates no leak in quadrants tested.

Figure 15A:
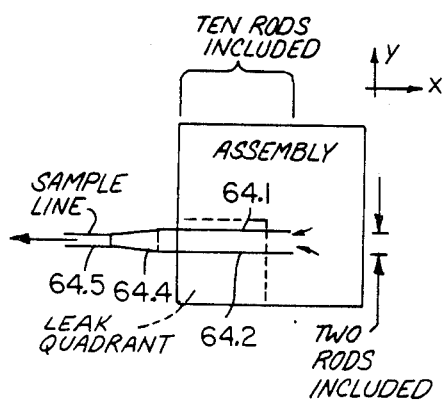
FIG. 15a is a schematic top view illustrating operative placement of the probe member of FIGS. 9 and 10, according to the method of this invention.
Figure 15B:
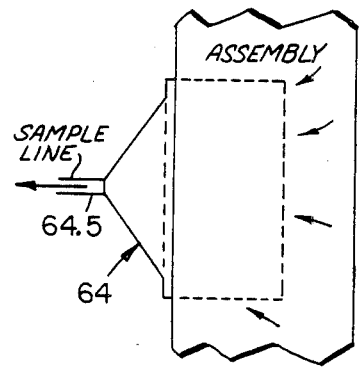

Once the quadrant in which the leaking fuel rod is present has been identified, the third probe 64 can be utilized in successive tests in a manner similar to that above-described with respect to probe 63 to further subdivide such quadrant, until the exact location of the leaking rod is determined. In the preferred embodiment, the third probe 64 is configured with an inter-baffle spacing "S3" sized to accommodate a row of two fuel rods within the width of its volumetric test zone "T". The baffle walls 64.1 and 64.2 have lengths sized to slightly extend beyond the length of the quadrant under test (see FIG. 15). Since the walls of the baffle plates 64.1 and 64.2 must be inserted between adjacent rows of fuel rods and control rods within the fuel assembly, which do not necessarily have the wider spacing afforded by the wider tracks such as "X1" and "Y1" of FIG. 4, the thickness dimension of such plates must be appropriately scaled down so as to slidably fit between the fuel rod and control rod row separations. In a preferred embodiment, the baffle plates 64.1 and 64.2 are constructed of stainless steel sheets of approximately 0.05 inches thick, and are configured to "reach" ten rods deep into a 17 by 17 assembly, as illustrated in FIG. 15. In a manner similar to that previously described with respect to use of the second probe 63, the third probe 64 is sequentially inserted into the fuel assembly so as to isolate two rows at a time of the fuel rods within the quadrant known to have the defective fuel rod, until the leak has been tracked down to a 2 by 10 matrix of fuel rods. The fuel assembly is then rotated 90° so that probe 64 can be inserted into the test quadrant to further subdivide the 2 by 10 matrix into 2 by 2 fuel rod segments. Once the leak has been narrowed to a 2 by 2 matrix, the test probe 64 can be shifted so as to subdivide the 2 by 2 matrix so as to isolate the exact rod containing the leak. Obviously, other variations of the testing sequence performed by probe 64 can be configured within the scope of this invntion. For example, once a leaking condition is sensed by probe 64 in a 2 by 10 row matrix, the probe can be shifted by one row to immediately narrow the possibly leaking fuel rods to a 1 by 10 row matrix.

While specific examples and configurations of the apparatus and method of practicing the invention have been disclosed herein, it will be readily apparent to those skilled in the art that other appropriate probe configurations and methods for using same can be envisioned by those skilled in the art. The invention is not limited to a particular probe configuration, material or method of mounting or using multiple probes in practicing the method of this invention. As an example, while semirigid baffle or containment member walls of the probe members have been disclosed, it is possible that such baffle members could be constructed of somewhat flexible material for enabling the probe members to bend around fuel and control rod members when being inserted within a fuel assembly. Similarly, while the probe assembly and method has been illustrated in FIG. 1 as being used to test a fuel assembly 30 in the spent fuel storage area, it will be understood that the test operation could be performed in other locations of the reactor facility as well. Other modifications of the invention will be apparent to those skilled in the art in light of the foregoing description. This description is intended to provide specific examples of apparatus and methods which clearly disclose the invention. Accordingly, the invention is not limited to the described embodiments, or to the use of specific elements or materials described therein. Alternative modifications and variations of the present invention which fall within the spirit and broad scope of the appended claims are covered.

I claim:

1. A method of locating a defective fuel rod within a nuclear fuel assembly that is leaking radioactive products into surrounding coolant of a liquid coolant bath in which said fuel assembly is immersed, wherein said fuel rod is one of a plurality of fuel rods interconnected in a generally parallel spaced-apart matrix in the fuel assembly, said method comprising the steps of:
    (a) physically isolating successive longitudinal segments of said matrix of fuel rods from adjacent portions of said coolant bath at least along two opposing lateral sides of said matrix;
    (b) selectively sampling the coolant surrounding said plurality of fuel rods within each of said successive physically isolated longitudinal segments of said matrix to determine the approximate one of said successive longitudinal segments at which radioactive products are being emitted from a fuel rod therein;
    (c) physically isolating successive submatrices of fuel rods at least along two opposing lateral sides of each of said submatrices from adjacent fuel rods in said approximate one of said successive longitudinal segments of said matrix at which it was determined that radioactive products were being emitted from a fuel rod therein; and
    (d) selectively sampling the coolant surrounding said fuel rods within each of said successive physically isolated submatrices to determine the one of said successive submatrices at which radioactive products are being emitted from a fuel rod therein.

2. The method as recited in claim 1, wherein the approximate one of the longitudinal segments of said matrix of fuel rods in said fuel assembly containing the leaking fuel rod is the longitudinal segment which contains the coolant with the highest sampled radioactive product content.

3. The method as recited in claim 1, wherein said step of physically isolating successive longitudinal segments of said matrix of fuel rods comprises defining a volumetric test zone about each one of said successive longitudinal segments wherein said volumetric test zone in one direction circumferentially encompasses the fuel rods in said matrix thereof in a plane transverse to the longitudinal axes of the fuel rods and in another direction longitudinally extends in the axial direction of said fuel rods a distance substantially less than the length of said fuel rods.

4. The method as recited in claim 1, wherein said each sampling step comprises:
    (a) drawing a sample of said coolant from a volumetric test zone defined respectively by each of said physically isolated longitudinal segments of said matrix of fuel rods and each of said physically isolated submatrices of said approximate one of said longitudinal segments of said matrix of fuel rods; and
    (b) measuring the radioactive product content of said drawn sample.

5. The method as recited in claim 1, wherein the sampling for said radioactive products of coolant surrounding said fuel rods within said submatrices is carried out in logical manner so as to isolate that fuel rod that is emitting said radioactive products into its surrounding coolant.

6. The method as recited in claim 1, wherein said step of physically isolating successive submatrices of fuel rods comprises selectively inserting one or more baffle members between adjacent rows of said fuel rods within said matrix thereof so as to isolate the coolant surrounding said fuel rods within one submatrix from that of an adjacent submatrix.

7. The method as recited in claim 6, wherein said baffle members are inserted between said adjacent fuel rod rows in a direction transverse to the longitudinal axes of said fuel rods.

8. A method of locating a leaking fuel rod in a nuclear fuel rod assembly of the type having a plurality of elongate fuel rods longitudinally extending between first and second ends in generally parallel spaced-apart manner and disposed within a liquid coolant bath, comprising the steps of:
    (a) placing a coolant sample probe of the type having a pair of baffles extending in cantilevered manner from a collector member to free ends and defining therebetween a volumetric test zone, in cooperative proximity to said fuel assembly rods and intermediate said first and second ends thereof such that a longitudinal segment of at least one of said fuel rods is disposed within said volumetric test zone and physically isolated by said baffles from any fuel rods in said assembly being located outside of said test zone; and
    (b) sampling the radioactive content of liquid coolant of said volumetric test zone when said sample probe is positioned as in step (a).

9. The method as recited in claim 8, wherein said fuel rod assembly has a cross-sectional area defining a matrix of a plurality of said fuel rods, and wherein said coolant sample probe is sized and configured and is placed in cooperative proximity with said fuel rod assembly such that longitudinal segments of substantially the entire matrix of said plurality of fuel rods are disposed within said volumetric test zone.

10. The method as recited in claim 9, wherein said baffles are characterized by an effective length dimension extending from said collector member toward said free ends and an effective width dimension generally orthogonally disposed to said length dimension and substantially less than the length of said fuel rods as measured between said first and said second ends thereof; wherein said baffles are disposed such that their width dimension lies generally parallel with the longitudinal axes of said fuel rods when said coolant sample probe is operatively positioned in close proximity to said fuel assembly rods.

11. The method as recited in claim 10, including the step of longitudinally moving said coolant sample probe relative to said fuel rod assembly such that said volumetric test zone traverses and said sampling is performed over substantially the entire length of said fuel rods between said first and said second ends thereof.

12. The method as recited in claim 11, including the step of determining that longitudinal position of said coolant sample probe relative to said fuel assembly where said radioactive content of said liquid coolant sample from said volumetric test zone is a maximum.

13. The method as recited in claim 8, wherein the step of placing said coolant sample probe in cooperative proximity to said fuel assembly rods comprises the step of moving said probe member relative to said fuel rod assembly such that at least one of said baffle members cooperatively slides between adjacent rows of said fuel rods, thereby isolating the longitudinal segments of those fuel rods within said volumetric test zone from those fuel rods outside of said test zone.

14. The method as recited in claim 13, including the step of systematically moving said test probe relative to said fuel rod assembly so as to isolate longitudinal segments of different groups of said fuel rods, and performing said sampling step on each of said groups of said fuel rods.

15. The method as recited in claim 14, wherein said fuel rod assembly has a cross-sectional area defining a matrix of a plurality of said fuel rods, and wherein said coolant sample probe is sized and configured to encompass approximately one-half of said fuel rods of said matrix within said volumetric test zone.

16. The method as recited in claim 15, further including the step of systematically moving said test probe and performing said sampling so as to subdivide said matrix of fuel rods into test quadrants.

17. The method as recited in claim 8, wherein the step of sampling includes drawing a sample of liquid coolant from said volumetric test zone and testing the radioactive content of said drawn coolant sample.

18. Test probe apparatus for determining the position of leaking fuel rods in a nuclear fuel rod assembly of the type having a plurality of elongate spaced fuel rods interconnected in generally parallel configuration, comprising:
  (a) a pair of opposed baffles longitudinally extending between first and second ends;
  (b) a collector operatively connecting said baffles adjacent said first ends thereof so as to define a volumetric test zone between said opposed baffles; said collector being configured to collect liquid coolant drawn from said volumetric test zone; and
  (c) wherein said probe apparatus is configured for operative alignment with a nuclear fuel rod assembly such that said baffles laterally project on opposite sides of at least one fuel rod of said assembly so as to encompass a longitudinal segment of said fuel rod within said volumetric test zone and physically isolate said longitudinal segment of said fuel rod within said test zone from any fuel rods in said assembly being located outside of said test zone.

19. Test probe apparatus as recited in claim 18, further including means cooperatively connected with said collector for drawing liquid coolant from said volumetric test zone through said collector.

20. Test probe apparatus as recited in claim 19, further including sensor means operatively connected with said collector for measuring the radioactive content of said liquid coolant drawn through said collector.

21. Test probe apparatus as recited in claim 18, further including means operatively connected with said baffles and collector for moving said volumetric test zone longitudinally relative to said fuel assembly rods.

22. Test probe apparatus as recited in claim 18, further including means operatively connected with said baffles and collector for moving said volumetric test zone laterally relative to said fuel assembly, whereby the number of said longitudinal segments of said fuel rods contained within said volumetric test zone at any instant of time can be selectively varied.

23. Test probe apparatus as recited in claim 22, further including means operatively connected with said baffles and collector for moving said volumetric test zone longitudinally relative to said fuel assembly rods.

24. Test probe apparatus as recited in claim 18, wherein said baffles are constructed of thin, semirigid sheet material having a thickness less than 0.20 inches.

25. Test probe apparatus as recited in claim 18, wherein said baffles are generally planar, and are disposed parallel to one another, and wherein at least one of said baffles is constructed of thin sheet material having a thickness sized to cooperatively slide between adjacent ones of said fuel rods within said fuel assembly.

26. Test probe apparatus as recited in claim 25, wherein said baffles are constructed of thin, semirigid sheet material having a thickness less than 0.20 inches.

27. Test probe apparatus as recited in claim 18, wherein said baffles are constructed of thin, semirigid sheet material having a thickness less than 0.10 inches.

28. Test probe apparatus as recited in claim 18, wherein the fuel assembly with which the probe is to be used has a cross-sectional area dimension as measured in a plane generally perpendicular to the longitudinal axes of said fuel rods and a longitudinal length dimension generally equal to that of the plurality of fuel rods comprising said fuel assembly; wherein said baffles are disposed generally parallel to one another; wherein said volumetric test zone has a cross-sectional area dimension as measured in a plane perpendicular to said baffles and extending through said collector which is larger than said fuel assembly cross-sectional area; and wherein the height of said baffles as measured perpendicular to the volumetric test zone cross-sectional dimension is significantly less than the longitudinal length of said fuel assembly.

29. Test probe apparatus as recited in claim 18, wherein the fuel assembly with which the probe is to be used has a cross-sectional area dimension as measured in a plane generally perpendicular to the longitudinal axes of said fuel rods and a longitudinal length dimension generally equal to that of the plurality of fuel rods comprising said fuel assembly; wherein said baffles are disposed generally parallel to one another; wherein said volumetric test zone has a cross-sectional area dimension as measured in a plane perpendicular to said baffles and extending through said collector which is approximately one-half that of said fuel assembly cross-sectional area; and wherein the height of said baffles as measured perpendicular to the volumetric test zone cross-sectinal dimension is significantly less than the longitudinal length of said fuel assembly.

30. A method of locating a defective fuel rod within a nuclear fuel assembly that is leaking radioactive products into surrounding coolant of a liquid coolant bath in which said fuel assembly is immersed, wherein said fuel rod is one of a plurality of fuel rods interconnected in a generally parallel spaced-apart matrix in the fuel assembly, said method comprising the steps of:

(a) determining the approximate one of a succession of longitudinal segments of said matrix of fuel rods at which radioactive products are being emitted from a fuel rod of said matrix;

(b) physically isolating successive submatrices of fuel rods at least along two opposing lateral sides of each of said submatrices from adjacent fuel rods in said approximate one longitudinal segment of said matrix at which it was determined that radioactive products were being emitted from a fuel rod therein; and (c) selectively sampling the coolant surrounding said fuel rods within each of said successive physically isolated submatrices to determine the one of said successive submatrices at which radioactive products are being emitted from a fuel rod therein.

31. The method as recited in claim 30 wherein said step of physically isolating successive submatrices of said approximate one longitudinal segment of said matrix of fuel rods comprises defining a volumetric test zone about each one of said successive submatrices wherein said volumetric test zone in one direction circumferentially encompasses the fuel rods in said submatrix thereof in a plane transverse to the longitudinal axes of the fuel rods and in another direction longitudinally extends in the axial direction of said fuel rods a distance substantially less than the length of said fuel rods.

32. The method as recited in claim 31, wherein said each sampling step comprises:

(a) drawing a sample of said coolant from said volumetric test zone defined respectively by each of said physically isolated submatrices of said matrix of fuel rods; and (b) measuring the radioactive product content of said drawn sample.

33. The method as recited in claim 30, wherein the sampling for said radioactive products of coolant surrounding said fuel rods within said submatrices is carried out in logical manner so as to isolate that fuel rod that is emitting said radioactive products into its surrounding coolant.

34. The method as recited in claim 30, wherein said step of physically isolating successive submatrices of fuel rods comprises selectively inserting one or more baffle members between adjacent rows of said fuel rods within said matrix thereof so as to isolate the coolant surrounding said fuel rods within one submatrix from that of an adjacent submatrix.

* * * * *